July 4, 1939.  P. A. RAICHE  2,164,885

MANUFACTURE OF RUBBER CAPS

Filed May 11, 1936

Inventor
Paul A. Raiche
Nathaniel Frucht
By  Attorney

Patented July 4, 1939

2,164,885

UNITED STATES PATENT OFFICE 2,164,885

MANUFACTURE OF RUBBER CAPS

Paul A. Raiche, North Providence, R. I.

Application May 11, 1936, Serial No. 79,027

7 Claims. (Cl. 221—60)

My present invention relates to the manufacture of rubber articles, and has particular reference to the manufacture of rubber caps.

Tubes of dental cream, shaving cream, and the like have heretofore been provided with metal or molded caps, the upper end of the tube having a threaded portion and the cap being correspondingly threaded to seat thereon. This construction of caps has been relatively expensive, and has required the use of a washer in order to keep the contents sealed against leakage. Moreover, it has been difficult to devise a construction for making a cap captive so that it may be unscrewed from the tube and yet remain permanently fastened to the tube body.

It is the principal object of my invention to devise a novel manufacture for a cap, which does not require screw threads or similar attaching means, but is retained in place by its own resilience.

It is a further object of my invention to devise a cap construction which may be manufactured by a simple dipping process, thus lowering the cost of manufacture.

It is an additional object of my invention to provide a simple method of manufacture which renders the cap captive to the tube or container body without requiring additional securing parts.

Still another object of my invention is to provide a cap for a tube or other container which is retained in place by its own resilience, and which has sufficient initial tension to effectively perform its function as a closure for the active life of the tube and its contents.

It is an additional object of my invention to provide a cap construction which does not require the use of a washer or other sealing means, and which preserves the tube contents against deterioration resulting from contact with air during the period prior to sealing and during the period of use of the tube contents.

With the above and other objects and advantageous features in view, my invention consists of a novel method of manufacture and a novel arrangement of parts more fully disclosed in the detailed description following, in conjunction with the accompanying drawing, and more specifically defined in the claims appended thereto.

It has been found desirable to provide a tube cap which is of resilient material and which closely fits the tube top, the cap being held captive to the tube body. I have therefore devised a novel construction in which I utilize a tube container of special formation, and which I dip into a coating solution of latex, rubber or rubber compound, either natural or synthetic, which may, if desired, contain curing ingredients in solution, the tube container top being shaped to provide a hinge base having an opening therethrough, whereby the completed dipped cap has a hinge portion extending through said opening to retain it captive.

The above described manufacture provides a cap having an attractive appearance, which may be initially secured to the tube container top by means of an initial dip in a cementitious solution, and which has sufficient elasticity and tension to function as an efficient captive cap and seal during the entire life of the tube container and its contents.

Figure 1:
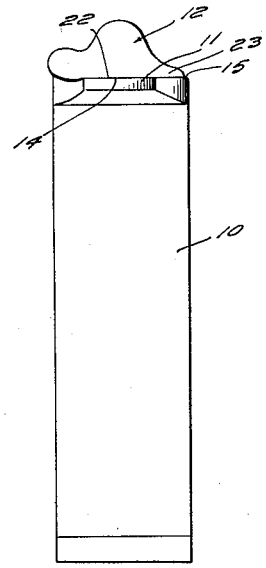
Fig. 1 is a view of a tube container, with the novel cap in place.
Figure 2:
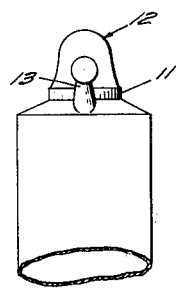
Fig. 2 is a side view of Fig. 1, parts being broken away.
Figure 3:
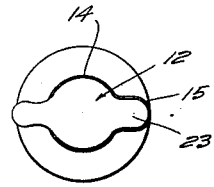
Fig. 3 is a top plan view of Fig. 1.
Figure 5:
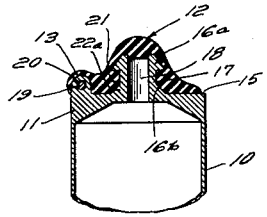
Fig. 5 is a vertical section, parts being broken away.
Figure 4:
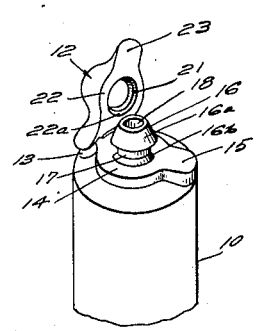
Fig. 4 is a perspective view showing the method of moving the cap to permit use of the tube contents.

Referring to the drawing, the tube container 10 is of the usual standard construction, having an open end for the insertion of the tube contents. The tube top 11 has mounted thereon a resilient cap 12, which as hereinafter explained is preferably obtained by a dipping operation, the tube top 11 having a hinge standard 13, see Fig. 5, a horizontal land 14 which terminates in a tip portion 15, and a nozzle or tip 16 which is undercut as indicated at 17 in Figs. 4 and 5, the nozzle 16 having its end portion and its base conical as indicated at 16a and 16b, and having a bore 18 communicating with the interior of the tube. The cap 12 has a pin connection 19 which extends through a suitable opening 20 provided in the hinge standard, the pin connection 19 being integral with the remainder of the cap, and has an inner portion 21 which fits into the undercut, the cap being shaped to the exact contour of the parts, whereby the base 22 of the cap seats on the land 14 and has a tab portion 23 which seats on the tip 15 and is graspable by the fingers of a user so that the cap can be readily drawn off the nozzle or mounted thereon; the conical inlet 22a of the cap greatly facilitates mounting of the cap on the nozzle 16.

Figure 6:
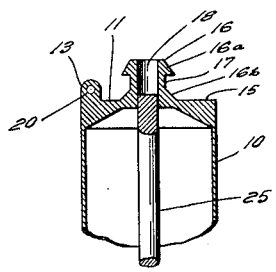
Fig. 6 is a section of the upper part of the tube prior to the dipping operation.
Figure 7:
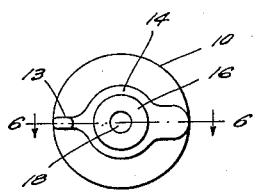
Fig. 7 is a top plan view of Fig. 6.
Figure 9:
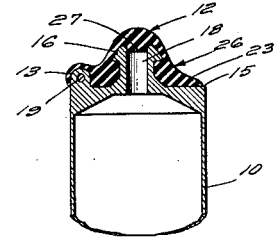
Fig. 9 is a sectional view similar to Fig. 5, the manufacture being modified to obtain an inner sealing plug.
Figure 8:
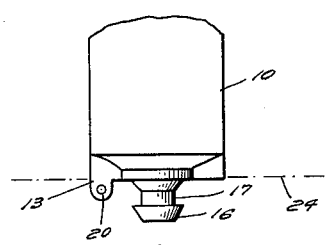
Fig. 8 is a view showing the position of the tube containers during the dipping operation.

When manufacturing the cap, the tube container is placed in reversed position as indicated in Fig. 8 and is dipped into a bath of latex or other rubber or compound rubber solution 24 which may be of natural or synthetic material, whereby a coat is obtained on the upper portion of the cap, the solution passing through the opening 20 so as to provide the desired hinge connection. Preferably, the tube containers are dipped simultaneously in large numbers by the use of suitable dipping boards of standard construction. If the tube contents are quite viscous, the tubes may be dipped when in full condition, in which case the tube ends are initially dipped into a cement solution so that the final dip to obtain the rubber cap will result in a cap which is cemented to the tube top. If the tubes are to contain liquid or semi-fluid contents, it is preferred to dip the tubes when empty, a rod 25 being inserted in each tube as indicated in Fig. 6 so as to prevent entrance of the latex or rubber solution into the bore 18. The surface tension of rubber or rubber compound in solution, and particularly latex prevents creeping of the cap coatings into the bore and over the edges of the land 14, even though the tube container top be dipped slightly below the surface of the solution, the resulting cap therefore having a smooth edge and a smooth base and presenting an attractive appearance. If desired, the land may be arcuate instead of flat.

If the rod 25 is omitted, the latex or rubber solution will enter inwardly into the bore 18, but not to any great extent, the cap 26 formed by the dipping operation thus having a central plug 27 which serves as an additional seal.

Figure 10:
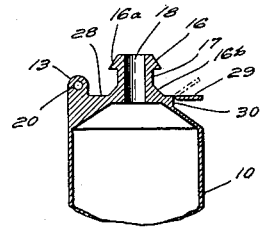
Fig. 10 is a view similar to Fig. 6 but showing a modified construction for the container.
Figure 11:
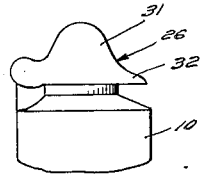
Fig. 11 is a view similar to Fig. 1, parts being broken away, showing the type of cap obtained with the tube construction of Fig. 10.

Although the above described manufacture provides a lifting tab 23, it may be desirable in certain constructions to have a lifting tab which is more readily grasped by the fingers. To obtain this result, I have modified the construction of the tube container top as indicated in Fig. 10, the land 28 now including a tip 29 which is preferably undercut as indicated at 30, whereby the tip 29 may be bent upwardly to break off after the cap has been formed by the dipping operation, thus permitting the cap 26, see Fig. 11, to have an outwardly extending finger graspable tab 32.

It is thus evident that the novel manufacture produces a flexible cap which effectively conforms to the shape of the top of the tube container and which is permanently mounted thereon, the entire manufacture comprising an inexpensive dipping operation, as the latex or rubber solution may have curing ingredients which will cure the cap on the container after a short time interval, as for example overnight.

The above described construction may be used for the manufacture of flexible caps for any purpose, as the dipped caps will conform to any shape of container top. Moreover, if it be desirable to have greater tension when the cap is closed on the container top, the cap may be dipped on a form identical with the container tube it is to be used with, but reduced in size, whereby the completed cap when mounted on the container tube will be under greater initial tension.

Although I have described the manufacture of the cap as by a dipping operation, it may be advisable for certain purposes to obtain the cap by means of a spraying operation or by means of a combined dipping or spraying operation. Changes in the method of manufacture, in the material used for the parts, in the size and formation of the cap and in the provision of hinge portions, tabs or other features may be made to suit the requirements for different designs or different uses, without departing from the spirit and the scope of the invention as defined in the appended claims.

I claim:

1. In combination, a container having a flat portion provided with an outlet nozzle, said nozzle being undercut, a cap of flexible rubber material detachably seated on said nozzle and having portions extending within the undercut and in engagement with said flat portion, said cap having a lifting tab extending laterally and positioned below said portions, and means for locking said cap to the container.

2. In combination, a container having a flat portion provided with an outlet nozzle, said nozzle being undercut, a cap of flexible rubber material detachably seated on said nozzle and having portions extending within the undercut and in engagement with said flat portion, and means for locking said cap to the container comprising cooperating hinge parts on the container body and the cap.

3. In combination, a container having an outlet nozzle, said nozzle being undercut, and a cap of flexible rubber materal detachably seated on said nozzle and having portions extending within the undercut, said cap having a lifting tab extending laterally and positioned below said portions.

4. In combination, a container having a flat portion provided with an outlet nozzle, said nozzle being undercut, a cap of flexible rubber material detachably seated on said nozzle and having portions extending within the undercut and in engagement with said flat portion, and means for locking said cap to the container comprising cooperating hinge parts on the container body and the cap, said cap hinge part being integral with said cap.

5. In combination, a container body having an outlet nozzle, a hinge standard on said body spaced from said nozzle, and an integral resilient cap detachably seated on said nozzle having an integral rearwardly extending portion hinged to said standard by a pin, said pin being integral with said cap.

6. In combination, a container body having an outlet nozzle, a vertical hinge standard on said body spaced from said nozzle, and an integral resilient rubber cap detachably seated on said nozzle having an integral rearwardly extending portion hinged to said standard by a pin, said pin being integral with said cap.

7. In combination, a container having a flat portion provided with an outlet nozzle, said nozzle being undercut, and a cap of flexible material detachably seated on said nozzle and having portions extending within the undercut and in contact with the flat portion, said cap having a lifting tab extending laterally, and positioned below the portions extending within the undercut.

PAUL A. RAICHE.